United States Patent
Rai et al.

(10) Patent No.: US 7,925,460 B2
(45) Date of Patent: Apr. 12, 2011

(54) SYSTEM AND METHOD FOR IMPROVING PRINT SHOP OPERABILITY

(75) Inventors: Sudhendu Rai, Fairport, NY (US); John C Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 411 days.

(21) Appl. No.: 11/954,569

(22) Filed: Dec. 12, 2007

(65) Prior Publication Data

US 2009/0157351 A1    Jun. 18, 2009

(51) Int. Cl.
*G01N 37/00*    (2006.01)
(52) U.S. Cl. .................................................. 702/81
(58) Field of Classification Search .......... 702/81, 702/180, 181
See application file for complete search history.

(56) References Cited

U.S. PATENT DOCUMENTS

| | | | |
|---|---|---|---|
| 6,573,910 B1 | 6/2003 | Duke et al. | |
| 2003/0079160 A1* | 4/2003 | McGee et al. | 714/39 |
| 2005/0065830 A1* | 3/2005 | Duke et al. | 705/7 |
| 2006/0224440 A1* | 10/2006 | Rai | 705/11 |
| 2007/0124182 A1* | 5/2007 | Rai | 705/7 |

* cited by examiner

*Primary Examiner* — Drew A Dunn
*Assistant Examiner* — Stephen J Cherry
(74) *Attorney, Agent, or Firm* — Pepper Hamilton LLP

(57) ABSTRACT

A computer implemented system for segmenting data collected from a document production environment is provided. The system includes determining, with a computer implemented data processing platform, that a set of document production related data should be represented as a non-normal distribution. A first test is performed and it is determined that the non-normal distribution should not be analyzed pursuant to a first analytic category. A second test is performed and when it is determined that the non-normal distribution should be analyzed pursuant to a second analytic category, an output, indicating that the non-normal distribution should be analyzed pursuant to the second analytic category is provided.

25 Claims, 7 Drawing Sheets

| Goodness of Fit Test | | |
|---|---|---|
| Distribution | AD | P |
| Normal | 4.043 | <0.005 |
| Lognormal | 3.790 | <0.005 |
| 3-Parameter Lognormal | 0.556 | – |
| Exponential | 43.262 | <0.003 |
| 2-Parameter Exponential | 0.321 | >0.250 |
| Weibull | 6.500 | <0.010 |
| 3-Parameter Weibull | 0.239 | >0.500 |
| Smallest Extreme Value | 6.870 | <0.010 |
| Largest Extreme Value | 2.016 | <0.010 |
| Gamma | 3.888 | <0.005 |
| 3-Parameter Gamma | 0.226 | – |
| Logistic | 3.145 | <0.005 |
| Loglogistic | 2.986 | <0.005 |
| 3-Parameter Loglogistic | 0.726g | – |

*FIG. 8*

SYSTEM AND METHOD FOR IMPROVING PRINT SHOP OPERABILITY

BACKGROUND AND SUMMARY

The disclosed embodiments relate generally to a system and method for improving the operability of a print production environment (including standalone or networked print shops) and, more particularly to a system and method for segmenting print production related data to improve the operability of the print production environment.

Document production environments, such as networked or non-networked print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions. As illustrated in U.S. Pat. No. 6,573,910 to Duke et al., the pertinent portions of which are incorporated herein by reference, print shops may be communicate with one another by way of a network.

In a significant number of modern print shops, comprehensive data relating to, among other things, equipment, job mix, job flow and labor assignments of a print shop, typically is collected with, among other things, semi automated means such as "handhelds." A comprehensive discussion of the types of data collected in a document production environment is provided in U.S. patent application Ser. No. 10/946,756, filed Sep. 22, 2004, by Duke et al., Publication No. 20050065830, published on Mar. 24, 2005, the pertinent portions of which are incorporated herein by reference. In one example of data collection, a handheld is used to read bar codes printed on jobs in a print shop, and automatically record the jobs progress through the shop. Given these data items, improved analyses of the data using process models of the shop that are amenable to analysis relative to alternative configurations and control policies in order to assess the productivity of the shop relative to these alternatives is facilitated. Additionally, by measuring the flow of jobs at various points in the work process, and using flow metrics to characterize this flow, the state of flow in the shop at selected instants in time can be evaluated and this information used to change the scheduling of the jobs, their routing and the allocation of labor in such a fashion as to improve the flow and hence the productivity of the shop.

Referring to U.S. patent application Ser. No. 11/289,891, filed Nov. 30, 2005, by S. Rai, Publication No. 20070124182, published on May 31, 2007, the pertinent portions of which are incorporated herein by reference, data is collected from a document production environment and processed with statistical analysis. In particular, statistical metrics are developed by assuming that the collected data corresponds with a given distribution type, such as a normal distribution. As indicated in the '182 publication, if a distribution is assumed to be normal when it is not, then the resulting statistical metrics will generally not suitably characterize the collected data. Distribution types of data sets collected from document production environments can vary widely, and using the wrong distribution type in statistically processing data collected from such environments can yield erroneous statistical metrics, resulting in incorrect and costly decisions regarding resource allocation.

In one aspect of the disclosed embodiments there is disclosed a system for processing data collected from a document production environment. The system includes: (A) a computer implemented data processing platform; and (B) a computer-readable storage medium comprising one or more programming instructions that, when executed, instruct the computer implemented data processing platform to: (1) read a set of document production related data, the document production related data being represented as a normal distribution or a non-normal distribution, (2) determine that the set of document production related data should be represented as a non-normal distribution, (3) perform a first test to determine whether the non-normal distribution should be analyzed pursuant to a first analytic category, (4) determine, with the first test of said (B)(3), that the non-normal distribution should not be analyzed pursuant to the first analytic category, (5) perform a second test to determine whether the non-normal distribution should be analyzed pursuant to a second analytic category, (6) determine, with the second test of said (B)(5), whether the non-normal distribution should be analyzed pursuant to the second analytic category, and (7) when it is determined, with the second test of (B)(5), that the non-normal distribution should be analyzed pursuant to the second analytic category, provide an output indicating that the non-normal distribution should be analyzed pursuant to the second analytic category.

In another aspect of the disclosed embodiments there is disclosed a computer implemented method for segmenting data collected from a document production environment. The method includes: (A) providing a set of document production related data, the document production related data being represented as a normal distribution or a non-normal distribution; (B) determining, with a computer implemented data processing platform, that the set of document production related data should be represented as a non-normal distribution; (C) performing, with the computer implemented data processing platform, a first test to determine whether the non-normal distribution should be analyzed pursuant to a first analytic category; (D) determining, with said (C), that the non-normal distribution should not be analyzed pursuant to the first analytic category; (E) performing, with the computer implemented data processing platform, a second test to determine whether the non-normal distribution should be analyzed pursuant to a second analytic category; and (F) when it is determined, with said (E), that the non-normal distribution should be analyzed pursuant to the second analytic category, providing an output indicating that the non-normal distribution should be analyzed pursuant to the second analytic category In yet another aspect of the disclosed embodiments there is disclosed a computer implemented method for processing a segmented set of document production related data. The set of document production related data includes a first distribution and the method includes: (A) partitioning the first distribution into a second distribution and a third distribution; (B) determining, with a computer implemented data processing platform, whether (1) the second distribution is normal or non-normal, and (2) the third distribution is normal or non-normal; (C) when it is determined with said (B) that the second distribution is non-normal, categorizing the second distribution into one of a plurality of analytic categories; (D) when it is determined with said (B) that the third distribution is non-normal, categorizing the third distribution into one of the plurality of analytic categories; and (E) providing an output indicating whether (1) the second distribution belongs to a normal distribution or one of the plurality of analytic categories, and (2) the third distribution belongs to a normal distribution or one of the plurality of analytic categories.

BRIEF DESCRIPTION OF THE DRAWINGS

FIG. 8 includes the results of a goodness of fit test for data summarized in FIG. 4.

DESCRIPTION OF DISCLOSED EMBODIMENT(S)

Figure 1:
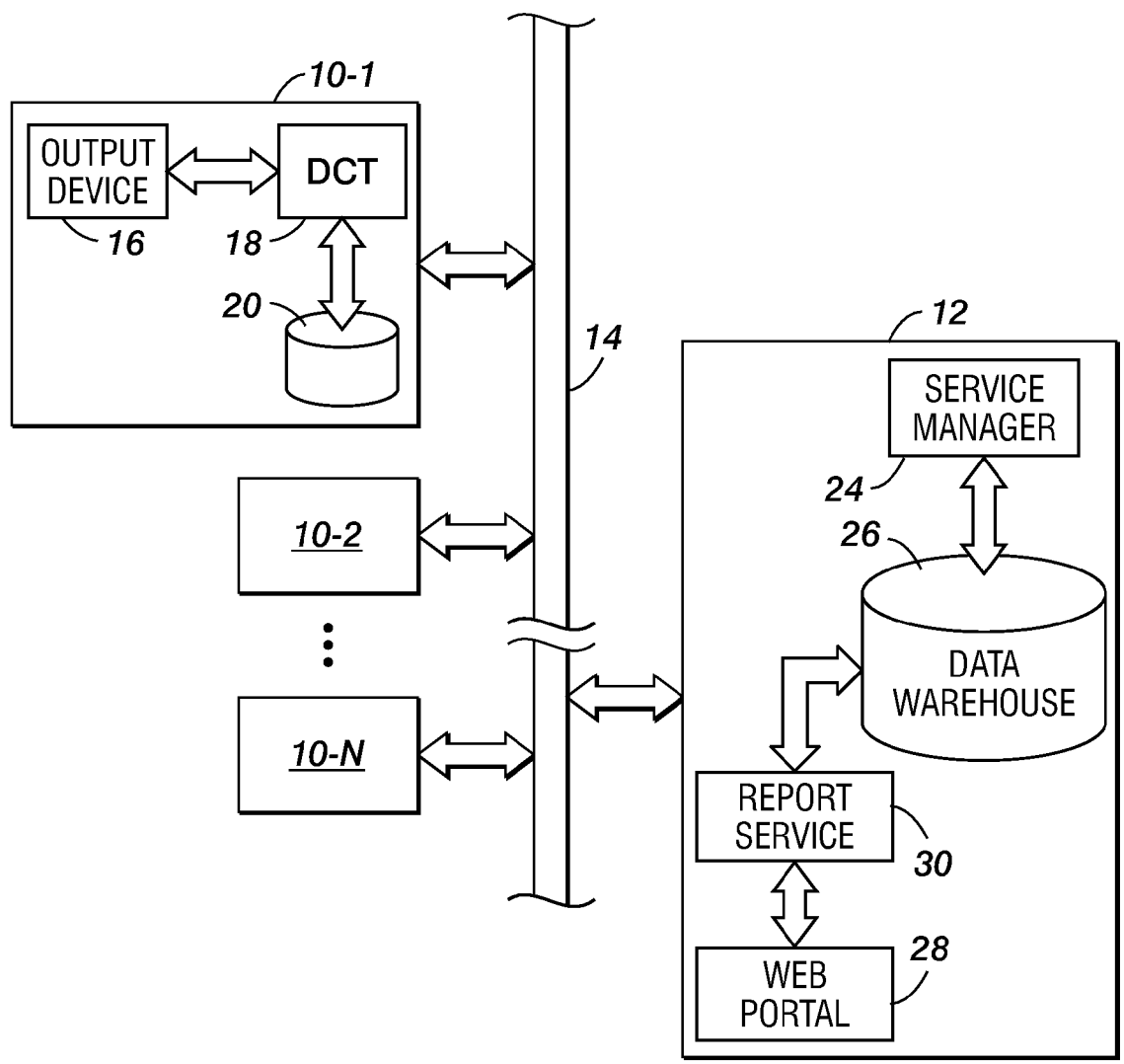
FIG. 1 is a block diagram of a data collection/processing architecture, suitable for use with the disclosed embodiments.

Referring to FIG. 1, a network print production system, with a data processing center, is shown. In the illustrated approach of FIG. 1, a series of document production centers 10-1 through 10-N (collectively referred to as document production centers 10, some of which may include print shops or production print facilities) communicate with the data processing center 12 by way of a network (such as a wide area network (possibly including the world wide web)) 14. At least one of the document production centers (e.g., document production center 10-1) includes an output device 16 communicating with a data collection tool ("DCT") 18. While particular attention is paid below to document production center 10-1, several of the document production centers 10 may include the combination of at least one output device and a DCT. Additionally, as should be apparent to those skilled in the art, the output device 16 may be used in the context of a print shop with a number of other document processing related devices, as illustrated in U.S. Pat. No. 7,079,266 to Rai et al., the pertinent portions of which are incorporated by reference.

In one example, the DCT is a programmable subsystem (possibly assuming the form of a suitable application programmable interface) capable of capturing data, including performance or demand related data, from the output device at selected time intervals. It should be appreciated that, consistent with U.S. Pat. No. 7,242,302 to Rai et al., the pertinent portions of which are incorporated herein by reference, the output device could assume a number of forms, such as a handheld device, PDA, or RFID related device. The DCT 18 may communicate with mass memory 20 for short term storage of, among other things, demand related data. Additionally, a wide variety of performance related information from the output device 16, including information relating to job type, client, duplex/simplex, page counts, service times, and impression counts, just to name a few, may be stored in mass memory 20.

The data processing center 12 includes a "service manager" 24 communicating with a "data warehouse" 26. In one illustrated embodiment, the service manager comprises a processing platform that is capable of performing the types of data analysis described below. As contemplated, a variety of data from the document production centers 10, including demand data from mass memory 20, is stored in the data warehouse. The data warehouse may also store job performance related data in the form of a database to facilitate a data segmentation approach, as described below. In the illustrated approach of FIG. 1, output of the service manager is placed in a format (e.g., a report including at least one forecast plot) suitable for communication to a network web portal 28 by a report generating application or service 30. The report, in turn, can be used, to the extent necessary, to adjust operation of the document production center to which the report relates. One such adjustment might include ordering inventory based on the report, while another such adjustment might include using the report to control aggregate or capacity planning.

As described in further detail below, statistical analysis of data sets collected from multiple document production environments reveal that different techniques are required to analyze different classes of data. For instance, data collected from a book publishing environment (e.g., machine throughput data) where output rates tend to be quite regular might correspond with a normal distribution. Data collected from a large print shop, on the other hand, where job sizes can vary significantly might correspond with a fat-tailed distribution. In some cases, the data might even correspond with a mixture of several distributions. It has been found that knowing the statistical nature of the underlying data can be instrumental in determining what statistical analysis technique should be applied to the data, and what value-added service(s) can, in turn, be provided.

Figure 2:
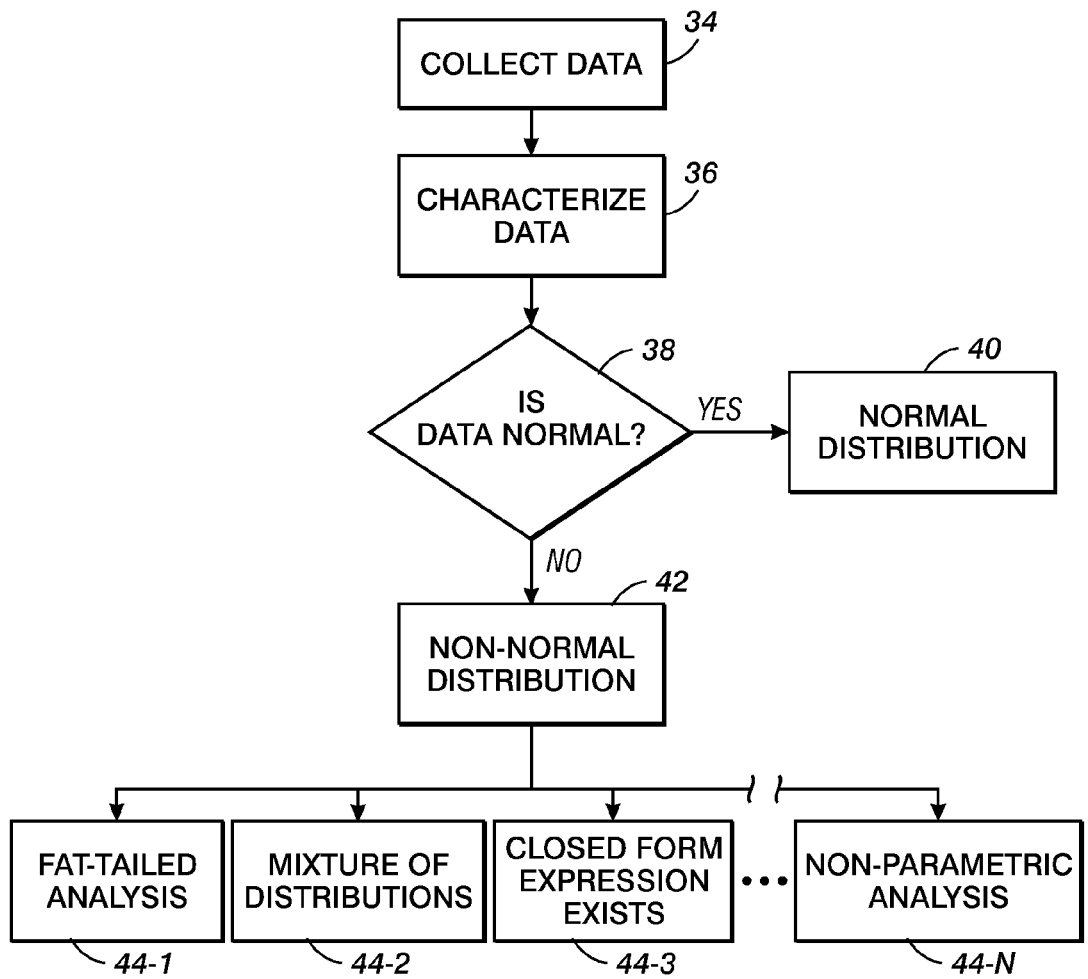
FIG. 2 is a flow diagram illustrating an approach for segmenting data collected from a document production environment in accordance with the disclosed embodiments.

Referring now to FIG. 2, an approach is shown for segmenting collected data, to better understand its statistical nature and thus how it can be more optimally analyzed. Initially, at 34, data is collected in the document production environment with a suitable mechanism, such as the data collection mechanism shown in the above-reference U.S. Publication No. 20070124182. The collected data is then characterized as a data set at 36, i.e., placed in a format suitable for statistical analysis. At 38 the data set is tested to determine whether it corresponds with a normal or non-normal distribution. To characterize whether the data set is normal (40) or non-normal (42), an Anderson-Darling normality test may be performed.

Figure 3:
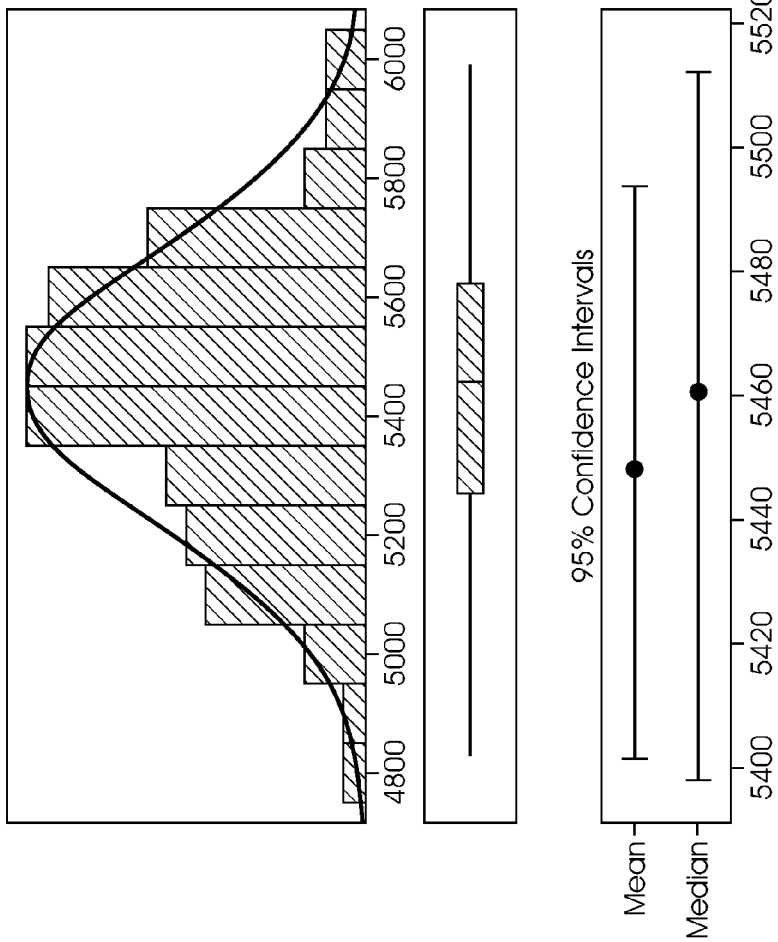
FIG. 3 is a statistical summary illustrating results of an Anderson-Darling test performed on a first set of data.
Figure 4:
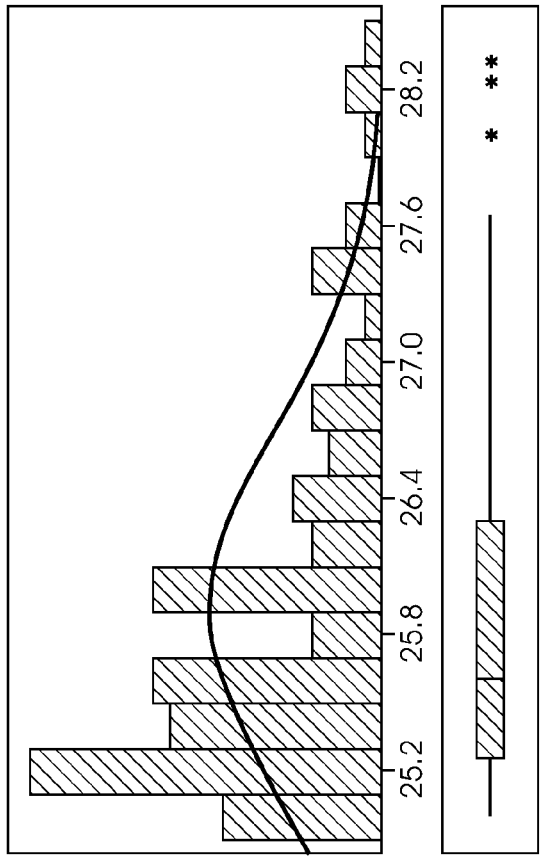
FIG. 4 is a statistical summary illustrating results of an Anderson-Darling test performed on a second set of data.
Figure 4:
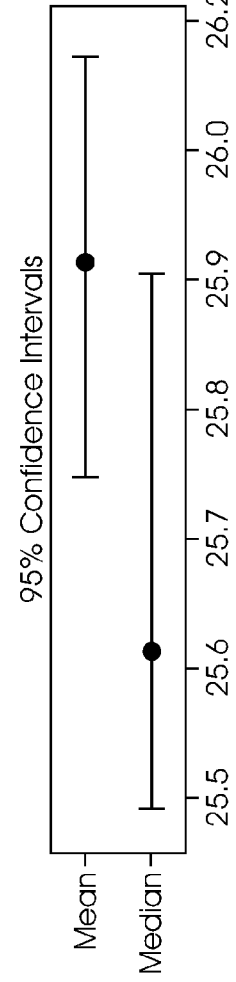

In accordance with the Anderson-Darling test, a p-value may be obtained for the data set and, if the p-value is greater than 0.05, then it can be concluded that the data set is normally distributed. Referring to FIG. 3, where the p-value is greater than 0.05, the result of a test, performed on a sample data set possibly corresponding with machine throughput data, is shown. Referring to FIG. 4, the result of a test where the p-value is less than 0.005 is shown.

If the data set is characterized as normal, then analysis in accordance with one of the listed techniques below may be performed:

Hypothesis Tests: t-tests—to compare normal distributions for differences;

Confidence interval calculations;

Control chart analysis;

Process capability analysis;

Sample size calculations.

Referring again to FIG. 2, if it is determined that the data set is not normally distributed, then, in accordance with the disclosed embodiments, the data set may be corresponded with one of several analytic categories 44-I, i.e., 44-1, 44-2, 44-3, . . . 44-N. In one aspect of the disclosed embodiments, the categories may be organized in a selected order so that the above-mentioned correspondence can be performed in accordance with that order. For instance, correspondence may be first considered for 44-1, then 44-2 and so on. In one example, 44-1 is a "fat-tailed" analysis, 44-2 is an analysis of a mixture of distributions, 44-3 is a closed form expression assessment, and 44-N is a non-parametric analysis. It is contemplated that the order of distribution types across 44-I could be varied from the selected order of the example of FIG. 2 without altering the intended features of the disclosed embodiments.

At 44-1, the data set is examined to determine if it belongs in the fat-tailed analytic category. In one example, the data of the data set corresponds with a group of jobs, with each job having a job size. A fat-tailed distribution may be characterized as a job size distribution possessing a tail that decays slowly. More particularly, as the value of a random variable (X) associated with such distribution increases, a probability associated with X decreases; however, there still may be a finite probability associated with very large values of the random variable. Fat-tailed distributions may have many small jobs mixed with a few very large jobs. A finite sample size drawn randomly from a fat-tailed distribution may have very high variances. As such, even though the majority of the job sizes may be small, a substantial contribution to the mean or variance for the jobs considered in the distribution may come from the few large jobs. Accordingly, the difference between the mean and median may be pronounced for fat-tailed distributions.

In one embodiment, X is associated with a cumulative density function ("CDF"), $F(x)=P[X \leq x]$. The area under the CDF from 0 to X as X approaches infinity may be equal to one. A complementary CDF ("CCDF") may be represented by $F_c(x)=P[X>x]$, where the CCDF=1−CDF. The CDF may be fat-tailed if the CCDF~$cx^{-\alpha}$ where $\alpha$ is between zero and two. As such, $$\lim_{x \to \infty} \frac{d \log F_c(x)}{d \log x} = -\alpha$$

Accordingly, the decay rate of a CCDF for large job sizes may be equal to $\alpha$. The decay rate of the CCDF may be represented by the slope of a log-log plot of CCDF vs. x.

Figure 5:
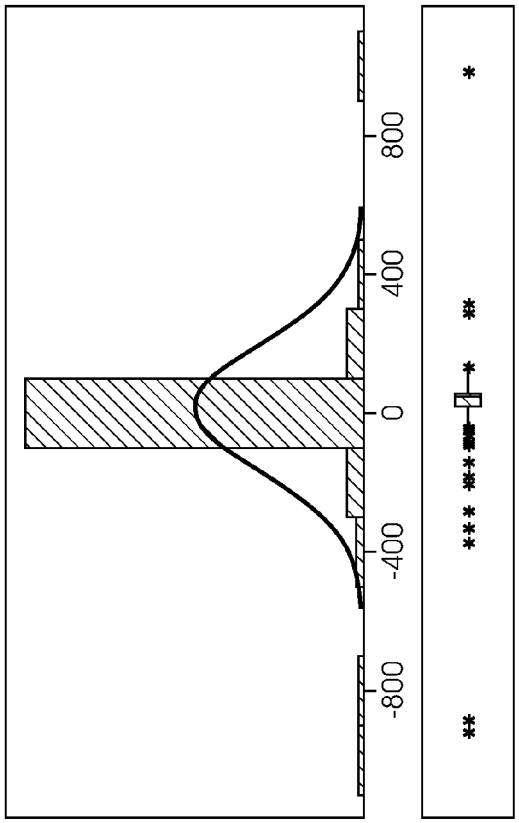
FIG. 5 is a statistical summary for a set of data corresponding with a "fat-tail" distribution.
Figure 5:
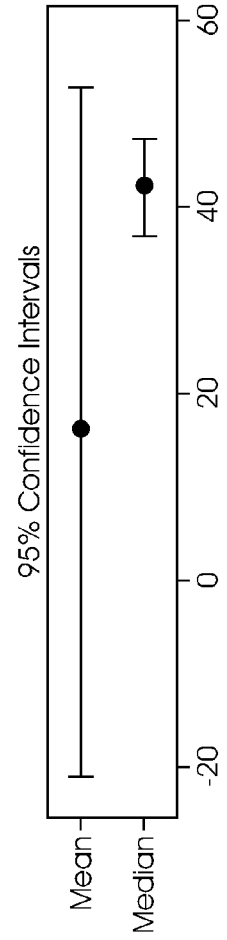

A coefficient of variation (standard deviation/mean) [CV] for the data set may provide an indication as to whether the associated distribution is fat-tailed. If the CV is very high, there is a high chance that the data of the data set conforms with a fat-tailed distribution. Referring to FIG. 5, a fat-tailed data set is shown. It has been found that job-size distribution in very large print shops with a significant amount of job variability is often fat-tailed. Further detailed discussion regarding fat-tailed distributions is provided in U.S. patent Publication No. 2009/0025000 (corresponding with U.S. patent application Ser. No. 11/779,392, entitled "Methods and Systems for Processing Heavy-tailed Job Distributions in a Document Production Environment", filed on Jul. 19, 2007 by S. Rai), the pertinent portions of which are incorporated herein by reference.

Figure 6:
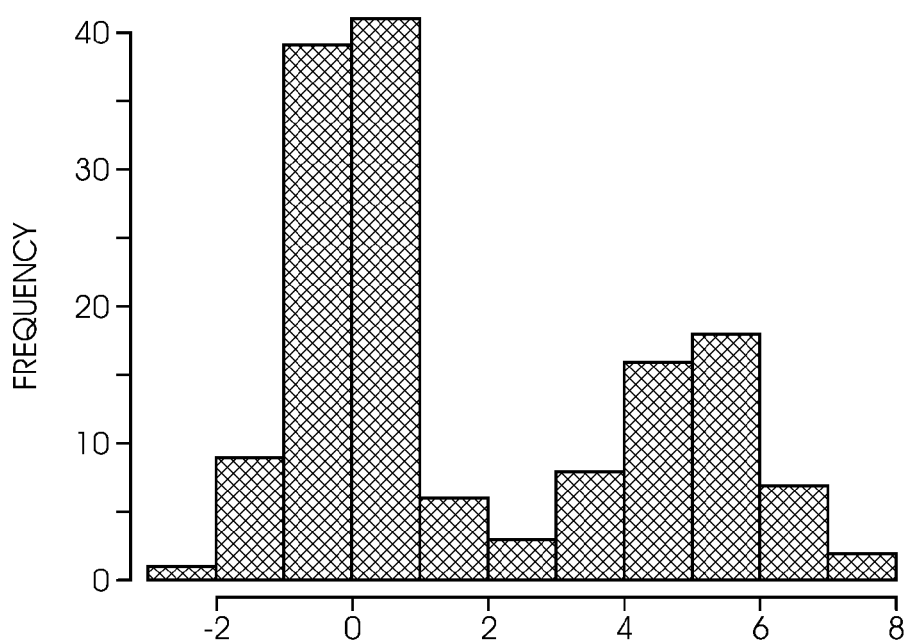
FIG. 6 is a histogram (or first distribution) illustrating a set of data including a mixture of distributions.
Figure 7:
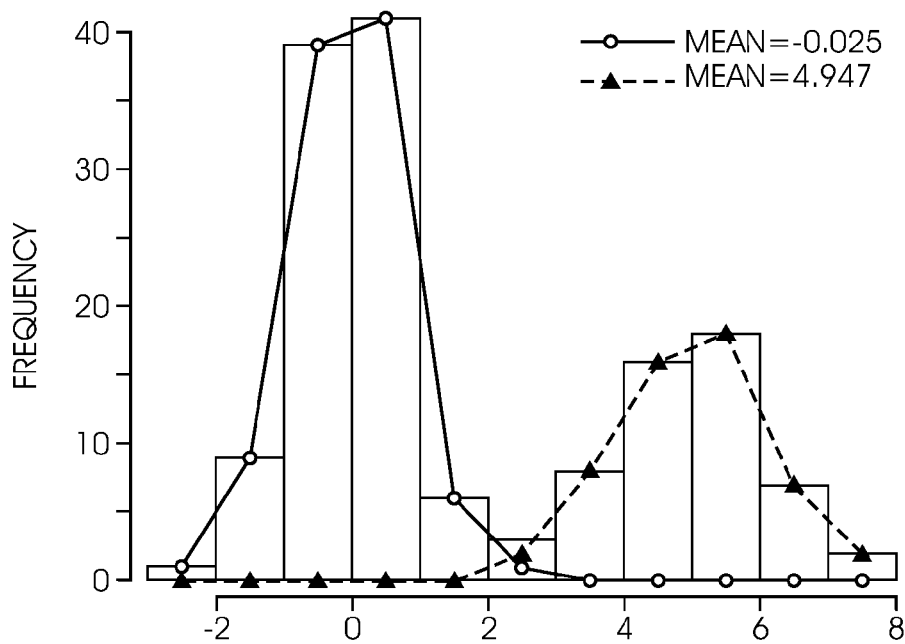
FIG. 7 is the first distribution of FIG. 6 partitioned into second and third distributions.

Referring again to FIG. 2, if it is determined that the data set should not be handled with the analytic category of 44-1, then the data is examined at 44-2 for multiple peaks or modes. Referring to FIG. 6, a simulated bimodal data set is shown. If the data are indeed from a mixture of two or more distributions, the data can be partitioned into components and each resulting distribution can be handled separately in accordance with the process of FIG. 2. Mixtures can be detected automatically by fitting mixtures of Gaussians to the underlying data and assessing the fit while penalizing the fit by the number of parameters (distributions) used to get the fit (the more components used, the better the fit, so the fit must be penalized by the number of distributions). For the example of FIG. 6, the minimum Bayesian Information Criterion (BIC) fit is obtained when the number of components is 2. Knowing that the number of components is two, an algorithm (employing, for instance, k-means) can be used to cluster each value into its component distribution. As shown in FIG. 7, the example of FIG. 6 can be viewed as two distributions, one with a mean of −0.025 and another with a mean of 4.947. The two distributions of FIG. 7 may be handled as two separate normal distributions.

It is contemplated that, in at least one example, one or more of the distributions of a mixture would be categorized as non-normal. In this event, a test relative to 44-1 (as described above), and/or a test relative to 44-3 (as described below) might be performed on each identified, non-normal distribution.

Referring again to FIG. 2, if it is determined that the data set should not be handled with either the analytic category of 44-1 or 44-2, then the data is examined to determine if it conforms with a known parametric distribution (e.g., Exponential or Bernoulli distribution). Referring to FIG. 8, a number of hypothetical parametric distributions are assigned to the data set and a goodness fit test is performed to obtain a p-value for each hypothetical distribution. In one approach, the underlying distribution that yields the highest p-value (and is at least greater than 0.05) is selected as the parametric distribution providing the best fit. When the goodness fit test is applied to the exemplary data set of FIG. 8, the underlying distribution best matches with a 3-Parameter Weibull distribution.

If a suitable fit cannot be obtained per 44-3, then the process continues through each next test until either an optimal analytic category is found or 44-N is reached. In the example of FIG. 2, there are only four analytic categories so 44-N corresponds with the fourth analytic category; however the disclosed embodiments contemplate that the data set could be considered for categorization in more than four analytic categories.

The analytic category of 44-N corresponds with a non-parametric procedure. Data with a uni-modal distribution and a thin tail that does not fit into any of the standard class of distributions (such as normal, lognormal, exponential, Weibull, or gamma) could, at 44-N, be analyzed with one or more of the following known non-parametric procedures: medians, median absolute deviations, quartiles, tests for location differences and so on.

Based on the above description, the following features of the disclosed embodiments should now be apparent:

A technique is provided in which a set of characterized document production related data is read and a determination is made as to whether such data should be represented as a non-normal distribution. For data to be represented as a non-normal distribution, tests may be performed to determine whether the non-normal distribution should be analyzed pursuant to a first analytic category or a second analytic category. An output, indicating which analytic category should be used, can then be provided.

The data may be from a set of document production related data collected from either a standalone print shop or a group of networked print shops.

As contemplated, an Anderson-Darling normality test, in which p-values corresponding respectively with multiple distributions are compared to one another, may be used to determine whether the set of document production related data is a normal distribution or a non-normal distribution. A report, indicating the analytic category in which a non-normal distribution should be considered, may be provided.

An analytic category may include one of at least four analyses, namely a fat-tailed distribution analysis, a mixture of distributions analysis, a closed parametric expression analysis, and a non-parametric analysis. In one example, when it is determined that the non-normal distribution should not be analyzed in one of the fat-tailed distribution, mixture of distributions or closed parametric expression analyses, the non-normal distribution may be analyzed pursuant to a non-parametric analysis.

The mixture of distributions analysis is capable of causing multiple analyses to be performed with respect to multiple distributions. In particular, the set of document production related data may comprise a first subset of document production related data and a second subset of document production related data. In one example, the first subset of document production related data corresponds with a first distribution type, and the second set of document production related data corresponds with a second distribution type.

In another example of the mixture of distributions analysis, a first distribution, with two or more modes, is partitioned into a second distribution and a third distribution. The second and third distributions may be automatically detected and each one of the second and third distributions may be categorized as normal or non-normal. Each one of the second and third distributions categorized as non-normal may be analyzed in one of a plurality of analytic categories.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for processing data collected from a document production environment, comprising:
   (A) a computer implemented data processing platform; and
   (B) a computer-readable storage medium comprising one or more programming instructions that, when executed, instruct the computer implemented data processing platform to:
   (1) read a set of document production related data, the document production related data being represented as a normal distribution or a non-normal distribution,
   (2) determine that the set of document production related data should be represented as a non-normal distribution,
   (3) perform a first test to determine whether the non-normal distribution should be analyzed pursuant to a first analytic category,
   (4) determine, with the first test of said (B)(3), that the non-normal distribution should not be analyzed pursuant to the first analytic category,
   (5) perform a second test to determine whether the non-normal distribution should be analyzed pursuant to a second analytic category, and
   (6) when it is determined, with the second test of (B)(5), that the non-normal distribution should be analyzed pursuant to the second analytic category, provide an output indicating that the non-normal distribution should be analyzed pursuant to the second analytic category,
   wherein the first and second analytic categories each comprise one of the following: a fat-tailed analysis and an analysis of a mixture of distributions.

2. The system of claim 1, wherein the set of document production related data is developed from a set of raw document production related data collected in one or both of a standalone print shop and two or more networked print shops.

3. The system of claim 1, wherein said determination of (B)(2) includes performing a test in which values corresponding with multiple distributions are compared with one another.

4. The system of claim 3, wherein the test comprises a Anderson-Darling normality test in which a p value is assigned to each one of the multiple distributions.

5. The system of claim 1, wherein said (B)(6) includes providing a report indicating that the non-normal distribution should be analyzed pursuant to the second analytic category.

6. The system of claim 1, wherein one of the first analytic category and the second analytic category comprises one of a fat-tailed distribution analysis, a mixture of distributions analysis, and a closed parametric expression analysis.

7. The system of claim 6, wherein multiple analyses can be performed for multiple distributions with the mixture of distributions analysis.

8. The system of claim 7, in which the set of document production related data comprises a first subset of document production related data and a second subset of document production related data, wherein the first subset of document production related data corresponds with a first distribution type, and the second set of document production related data corresponds with a second distribution type.

9. The system of claim 1, wherein said (B) further includes:
   (7) when it is determined, with said (B)(5), that the non-normal distribution should not be analyzed pursuant to the first or second analytic category, perform a third test to determine whether the non-normal distribution should be analyzed pursuant to a third analytic category,
   (8) when it is determined, with said (B)(7), that the non-normal distribution should be analyzed pursuant to the third analytic category, provide an output indicating that the non-normal distribution should be analyzed pursuant to the third analytic category.

10. The system of claim 9, wherein said (B) further includes:
    (9) when it is determined, with said (B)(3), (B)(5) and (B)(7), that the non-normal distribution should not be analyzed pursuant to any one of the first, second and third analytic categories, provide an output indicating that the non-normal distribution should be analyzed pursuant to a non-parametric analysis.

11. A computer implemented method for segmenting data collected from a document production environment, comprising:

(A) providing a set of document production related data, the document production related data being represented as a normal distribution or a non-normal distribution;

(B) determining, with a computer implemented data processing platform, that the set of document production related data should be represented as a non-normal distribution;

(C) performing, with the computer implemented data processing platform, a first test to determine whether the non-normal distribution should be analyzed pursuant to a first analytic category;

(D) determining, with said (C), that the non-normal distribution should not be analyzed pursuant to the first analytic category;

(E) performing, with the computer implemented data processing platform, a second test to determine whether the non-normal distribution should be analyzed pursuant to a second analytic category; and (F) when it is determined, with said (E), that the non-normal distribution should be analyzed pursuant to the second analytic category, providing an output indicating that the non-normal distribution should be analyzed pursuant to the second analytic category, wherein the first and second analytic categories each comprise one of the following: a fat-tailed analysis and an analysis of a mixture of distributions.

12. The method of claim 11, further comprising:
(G) collecting a set of raw document production related data from one of a standalone print shop and two or more networked print shops; and
(H) developing the set of document production related data from the set of raw data collected per said (G).

13. The method of claim 11, wherein said (B) includes performing a test in which values corresponding with multiple distributions are compared with one another.

14. The method of claim 11, wherein said (F) includes providing a report indicating that the non-normal distribution should be analyzed pursuant to the second analytic category.

15. The method of claim 11, further comprising:
(G) configuring one of the first analytic category and the second analytic category comprises as a fat-tailed distribution analysis, a mixture of distributions analysis, and a closed parametric expression analysis.

16. The method of claim 11, further comprising:
(G) performing multiple analyses for multiple distributions with the mixture of distributions analysis.

17. The method of claim 16, in which the set of document production related data comprises a first subset of document production related data and a second subset of document production related data, wherein said (G) includes corresponding the first subset of document production related data with a first distribution type, and the second set of document production related data corresponds with a second distribution type.

18. The method of claim 11, further comprising:
(G) when it is determined, with said (C) and (E), that the non-normal distribution should not be analyzed pursuant to the first or second analytic category, perform a third test to determine whether the non-normal distribution should be analyzed pursuant to a third analytic category; and
(H) when it is determined, with said (G), that the non-normal distribution should be analyzed pursuant to the third analytic category, providing an output indicating that the non-normal distribution should be analyzed pursuant to the third analytic category.

19. The method of claim 18, further comprising:
(I) when it is determined, with said (C), (E) and (G), that the non-normal distribution should not be analyzed pursuant to any one of the first, second and third analytic categories, provide an output indicating that the non-normal distribution should be analyzed pursuant to a non-parametric analysis.

20. A computer implemented method for processing a segmented set of document production related data, the set of document production related data including a first distribution, comprising:
(A) partitioning the first distribution into a second distribution and a third distribution;
(B) determining, with a computer, whether (1) the second distribution is normal or non-normal, and (2) the third distribution is normal or non-normal;
(C) when it is determined with said (B) that the second distribution is non-normal, categorizing the second distribution into one of of the following analytic categories: a fat-tailed distribution and a mixture of distributions;
(D) when it is determined with said (B) that the third distribution is non-normal, categorizing the third distribution into one of the following analytic categories: a fat-tailed distribution and a mixture of distributions; and
(E) providing an output indicating whether (1) the second distribution belongs to a normal distribution, a fat-tailed distribution or a mixture of distributions, and (2) the third distribution belongs to a normal distribution, a fat-tailed distribution or a mixture of distributions.

21. The method of claim 20, in which the first distribution includes multiple modes, wherein said (A) includes partitioning the first distribution with the multiple modes.

22. The method of claim 20, said (C) includes categorizing the second distribution into one of a fat-tailed distribution analysis and a closed parametric expression analysis when it is determined with said (B) that the second distribution is non-normal.

23. The method of claim 20, said (D) includes categorizing the second distribution into one of a fat-tailed distribution analysis and a closed parametric expression analysis when it is determined with said (B) that the third distribution is non-normal.

24. The method of claim 20, further comprising:
(F) automatically detecting that the first distribution includes the second and third distributions.

25. The method of claim 24, wherein said (F) includes fitting mixtures of Gaussians to the first distribution and assessing the fit.

* * * * *